United States Patent
Papst

[19]

[11] Patent Number: 5,877,916
[45] Date of Patent: Mar. 2, 1999

[54] DISK STORAGE DEVICE WITH STATOR-ROTOR POSITIONING PROVIDING IMPROVED SPINDLE TORQUE AND ACCELERATION

[76] Inventor: Georg F. Papst, Max-Planck-Strasse 14, D-67549 Spaichingen, Germany

[21] Appl. No.: 834,701

[22] Filed: Apr. 1, 1997

[51] Int. Cl.⁶ .................................................. G11B 17/08
[52] U.S. Cl. ..................................... 360/98.07; 360/99.08
[58] Field of Search ............................... 360/98.07, 99.08

[56] References Cited

U.S. PATENT DOCUMENTS

| | | | |
|---|---|---|---|
| Re. 32,702 | 6/1988 | Hasler et al. | 360/97 |
| 3,864,748 | 2/1975 | Herdman et al. | 360/102 |
| 3,922,590 | 11/1975 | Warren et al. | 318/138 |
| 4,062,049 | 12/1977 | Dirks | 360/78 |
| 4,150,406 | 4/1979 | Stollorz | 360/97 |
| 4,275,339 | 6/1981 | Burke et al. | 318/138 |
| 4,285,016 | 8/1981 | Gilovich | 360/84 |
| 4,336,470 | 6/1982 | Gutris | 310/42 |
| 4,352,133 | 9/1982 | Hager | 360/106 |
| 4,430,603 | 2/1984 | Müller | 318/254 |
| 4,519,010 | 5/1985 | Elsaesser et al. | 360/99.08 |
| 4,535,373 | 8/1985 | Schuh | 360/97 |
| 4,656,545 | 4/1987 | Kakuta | 360/98 |
| 4,672,250 | 6/1987 | Seitz | 310/90 |
| 4,698,542 | 10/1987 | Müller | 310/67 R |
| 4,739,425 | 4/1988 | Dierkes et al. | 360/97 |

(List continued on next page.)

FOREIGN PATENT DOCUMENTS

| | | |
|---|---|---|
| 0 151 259 | 8/1985 | European Pat. Off. . |
| 0 172 459 | 2/1986 | European Pat. Off. . |
| 0 263 932 | 4/1988 | European Pat. Off. . |
| 0 287 768 | 10/1988 | European Pat. Off. . |
| 0291295 | 11/1988 | European Pat. Off. . |
| 0 425 312 A2 | 5/1991 | European Pat. Off. . |
| 2325473 | 12/1974 | Germany . |
| 2421379 | 11/1975 | Germany . |
| 3326543 | 1/1985 | Germany . |

| | | |
|---|---|---|
| 50-128510 | 10/1975 | Japan . |
| 52-42209 | 3/1977 | Japan . |
| 53-57010 | 5/1978 | Japan . |
| 54-41619 | 3/1979 | Japan . |

(List continued on next page.)

OTHER PUBLICATIONS

European Search Report, Application No. EP 97 10 5429 (Aug. 6, 1997).
European Search Report, Application No. EP 97 10 5430 (Aug. 6, 1997).
Drawing "GAE Motor:" (1 sheet) Papst–Motoren KG.
Drawing "Motor 933 5310 001" (2 sheets) Papst–Motoren KG.

*Primary Examiner*—A. J. Heinz
*Attorney, Agent, or Firm*—Finnegan, Henderson, Farabow, Garrett & Dunner, L.L.P.

[57] ABSTRACT

A disk storage device that utilizes an inner rotor spindle motor in which the spindle shaft is fixed to the disk mounting hub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber. By configuring the inner rotor, including the disk support hub, to rotate around the outer diameter of the bearing tube, an elongated "gap seal" is formed, allowing more efficient containment of contaminants from the bearings without need for expensive ferrofluidic seals. One end of the bearing tube extends into an internal cavity formed within the disk support hub. This arrangement requires the hub to have a hollow interior, providing for a rotor structure having further reduced mass, further improving acceleration and vibration characteristics of the spindle.

41 Claims, 6 Drawing Sheets

U.S. PATENT DOCUMENTS

| | | | |
|---|---|---|---|
| 4,760,298 | 7/1988 | Kitahara et al. | 310/67 |
| 4,775,906 | 10/1988 | Suzuki et al. | 360/98 |
| 4,797,762 | 1/1989 | Levy et al. | 360/99.06 |
| 4,805,055 | 2/1989 | Wright | 360/106 |
| 4,843,500 | 6/1989 | Elsaesser et al. | 360/97 |
| 4,965,476 | 10/1990 | Lin | 310/51 |
| 5,132,856 | 7/1992 | Takahashi | 360/99.08 |
| 5,157,295 | 10/1992 | Stefansky et al. | 310/90 |
| 5,216,557 | 6/1993 | Elsaesser et al. | 360/99.08 |
| 5,352,947 | 10/1994 | MacLeod | 360/99.08 |
| 5,382,853 | 1/1995 | von der Heide et al. | 310/67 R |
| 5,400,197 | 3/1995 | Jabbari et al. | 360/99 |
| 5,446,610 | 8/1995 | Elsaesser et al. | 360/99.08 |

FOREIGN PATENT DOCUMENTS

| | | |
|---|---|---|
| 58 22571 | 2/1983 | Japan . |
| 60-103554 | 6/1985 | Japan . |
| 62-125573 | 6/1987 | Japan . |
| 03222150 | 10/1991 | Japan . |
| 04172951 | 6/1992 | Japan . |
| 04178151 | 6/1992 | Japan . |
| 05094669 | 4/1993 | Japan . |
| 08065941 | 3/1996 | Japan . |
| 1486070 | 9/1977 | United Kingdom . |
| 2075240 | 11/1981 | United Kingdom . |
| 2166586 | 5/1986 | United Kingdom . |
| 2195812 | 4/1988 | United Kingdom . |

DISK STORAGE DEVICE WITH STATOR-ROTOR POSITIONING PROVIDING IMPROVED SPINDLE TORQUE AND ACCELERATION

This invention relates to disk storage devices and, more particularly, to a disk storage device having a spindle motor with enhanced torque, acceleration and vibration characteristics.

BACKGROUND OF THE INVENTION

Disk storage devices, especially disk storage devices utilizing one or more rigid magnetic data storage disks directly coupled to the rotor of a spindle drive motor and housed within a "clean room" chamber, typically use an "outer rotor" brushless DC motor for rotating the storage disks past data read/write heads. The heads write and read digital data on the surface of the disks. In an "outer rotor" brushless motor, a rotor having an annular permanent magnet surrounds a multi-pole stator that is mounted concentric with the shaft defining the rotation axis of the motor.

An outer rotor motor employs a rotor that encompasses the stator element. The rotor therefore requires a diameter that adds to the mass and angular inertia of the rotor and increases the time required for the motor to reach the operating speed, which may be 6000 RPM or higher, at the time of startup. The radially displaced mass also amplifies vibrations due to imbalances, especially at higher operational speeds.

It is an object of the invention to provide a disk storage device that utilizes a spindle drive motor that has a reduced rotary mass and angular inertia and accordingly reduces the time required to accelerate the storage disks to operating speed at the time of startup.

It is another object to provide a disk storage device that utilizes a spindle motor that is not limited by the diameter of the disk support hub in providing sufficient torque to rapidly accelerate a stack of many disks at the time of startup.

It is a further object to provide a disk storage device that has an increased diameter spindle support structure to enhance the rigidity of the disk axis.

Still a further object is to provide a disk storage device that reduces the amount of spindle run out caused by play in the support bearings.

Another object is to provide a disk storage device that achieves an enhanced air gap seal between the clean chamber in which the disks operate and the spindle motor elements.

Yet another object is to provide a disk storage device that reduces radially-displaced spindle mass and is capable of operation at higher speeds with lower vibration.

SUMMARY OF THE INVENTION

The foregoing and other objects are achieved by providing a disk storage device that utilizes an inner rotor spindle motor in which the spindle shaft is fixed to the disk mounting hub and rotates therewith. Support for the spindle is provided by a bearing tube that has a greater diameter and greater rigidity than the stationary shaft or post typically employed to support the disk stack in an outer rotor arrangement. The bearing tube supports the bearings in which the spindle shaft is journalled and allows wider axial spacing between the bearings, reducing spindle run out. At the same time, the bearing tube functions to entrap contaminants from the bearings within the internal motor space and reduces contamination in the clean chamber.

By configuring the inner rotor, including the disk support hub, to rotate around the outer diameter of the bearing tube, an elongated "gap seal" is formed, allowing more efficient containment of contaminants from the bearings without need for expensive ferrofluidic seals. One end of the bearing tube extends into an internal cavity formed within the disk support hub. This arrangement requires the hub to have a hollow interior, providing for a rotor structure having further reduced mass, further improving acceleration and vibration characteristics of the spindle.

These and other objects, features and advantages of the invention are illustrated in the following description of preferred embodiments, as illustrated in the drawings as follows.

DETAILED DESCRIPTION OF PREFERRED EMBODIMENTS

Figure 1:
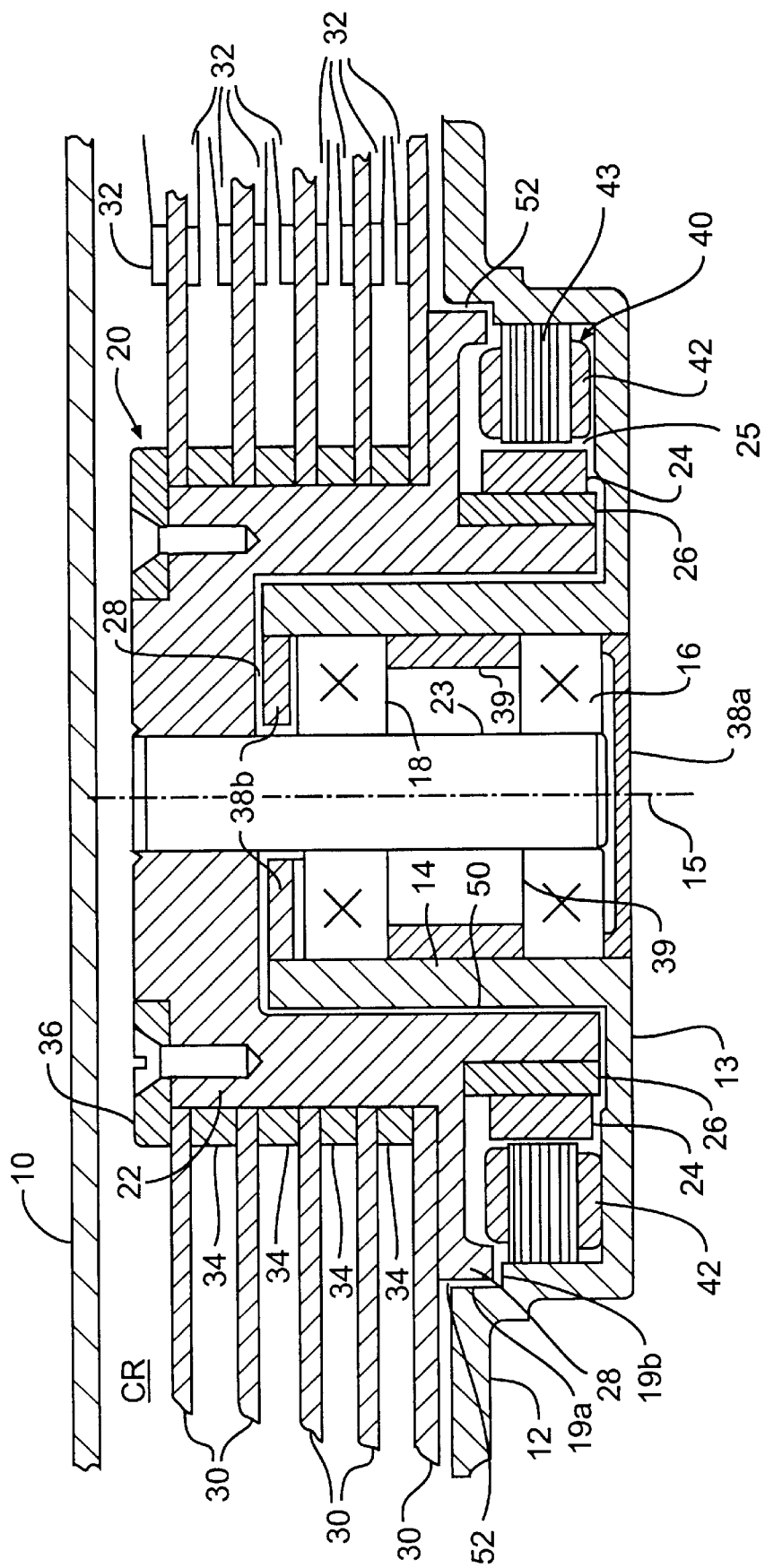
FIG. 1 is a cross-section taken along the spindle axis of a disk storage device employing a first embodiment of the invention.

Referring to FIG. 1, the disk storage device, which may be, for example, a magnetic hard disk drive (HDD), includes a housing having an upper partition or wall 10 and a lower partition or wall 12 which adjoin side walls (not shown) to enclose a substantially sealed "clean room chamber" CR. Clean room chamber CR is a finally sealed clean room manufactured to HDD industry contamination standards. One or more data storage disks 30 are located within the clean room chamber and cooperate with read/write heads 32. During operation the heads "fly" on a thin layer of air proximate to the surface of the rotating disks and function as transducers for magnetically reading and recording (writing) digital data in tracks on the surfaces of the disks.

The disks 30 are rotated at an operating speed that may be in the range of 3,000 to 10,000 RPM. The disks are mounted on a hub 22 that is part of a rotor assembly 20 of a brushless DC spindle motor. The drive elements of the spindle motor are supported inside the clean room chamber within a recessed portion 13 of the lower wall 12 of the HDD housing. Hub 22 is cylindrically shaped and dimensioned to fit through the center opening of the disks. The hub has a radially extending shoulder 28 for supporting the lower disk 30 that may be part of a disk stack. The hub 22 may be made of an aluminum alloy, which is a material that is suitable for use after machining in a clean room environment. One or more spacer rings 34 separate the disks and a clamping element 36 is fastened to the closed end of the rotor 20 and presses against the disk stack to couple the disks to the hub 22.

The rotor assembly 20 rotates on a shaft 23 that is press-fit into or otherwise attached to the closed end of the rotor. Shaft 23 is supported to rotate about the spindle axis 15 by a pair of axially spaced bearings 16 and 18. Bearings 16 and 18 are mounted within a bearing tube 14 or other form of cylindrical support member that is an integral part of, or is attached to, the recessed wall portion 13. Bearing spacer member 39 maintains the bearings 16 and 18 in the correct axial locations. The recessed wall portion 13 may be an integral part of the HDD housing wall 12, or it may be in the form of a detachable assembly flange. If the latter, the spindle motor can be manufactured as a separate unit that is installed into an opening in the HDD housing at the time of final HDD assembly.

The spindle motor further includes a permanent magnet 24 that is in the form of an annular ring affixed to a cylindrical ferromagnetic support member 26. The latter is attached to the lower end of the rotor hub portion 22. Hub 22 has a cylindrically-shaped central cavity 29 that fits over the upper end of bearing tube 14. A narrow gap 50 is formed between the outer surface of the bearing tube and the inner surface of the rotor 20 and forms a "gap seal" to reduce the transfer of particles and other contaminants emanating from the bearings 16 and 18 into the clean room chamber. A sealing washer 38b is inserted above bearing 18 to further enhance the effect of the seal. Conforming interior surfaces 19a and 19b of the housing wall 12 surround the edge of the disk mounting flange 28 of the hub 22. A narrow gap 52 is formed between the outer periphery of the flange 28 and the surfaces 19a and 19b and functions as a further gap seal to retard the transfer of contaminants into the clean room chamber. A cap 38a is inserted to close the opening at the lower end of bearing tube 14.

A stator assembly 40 is supported within the recessed wall portion 13 and encircles the rotor magnet 24. The stator 40 has windings 42 wound on the stator laminations 43 and a plurality of poles separated from the magnet 24 by a cylindrically-shaped air gap 25. As shown in FIG. 9, which illustrates the stator arrangement of the similar spindle motor of FIG. 8, the stator 40 (shown as 140 in FIG. 9) may, for example, include twelve equally spaced poles and associated windings, that cooperate with, for example, eight rotor poles (shown schematically by dots on magnet 24). A motor driving circuit (not shown) switches timed current pulses into the stator windings to generate flux that interacts with the flux produced by magnet 24 to generate torque on the rotor 20. This rotates the rotor and enables data transfer to occur between the read/write heads 32 and the recording surfaces of disks 30.

Figure 2:
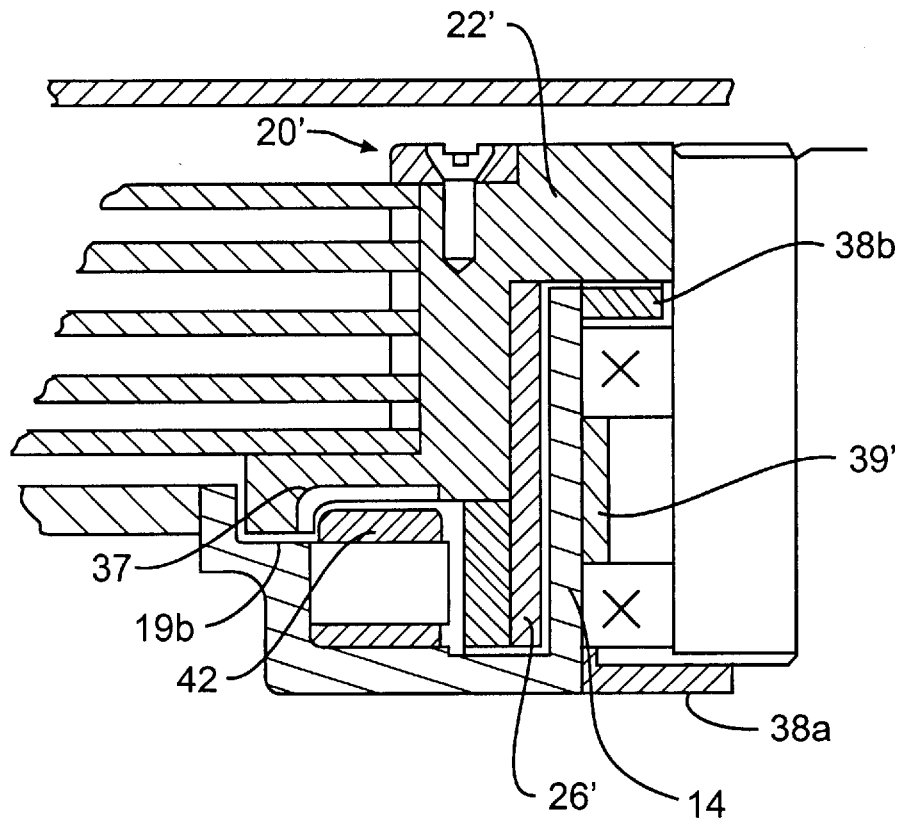
FIGS. 2, 3, 4, and 5 are cross-sections taken along the spindle axis, each illustrating a modified form of the spindle motor.

FIG. 2 shows a second embodiment of a disk storage device having a modified form of rotor assembly 20'. The aluminum hub 22' is fitted with a ferromagnetic insert 37 conforming generally to and spaced from the upper side of winding 42 and curving down to a closely-spaced gap from inner peripheral surface 19b of housing wall 12. Insert 37 acts as a shield to prevent stray magnetic flux from impinging on the data storage disks. Ferromagnetic magnet support member 26' is extended along, and uniformly spaced from, substantially the entire length of bearing tube 14. The outer surface of bearing tube 14 and the inner surface of support sleeve 26' are precisely machined to leave a narrow "gap seal" running between them.

Figure 3:
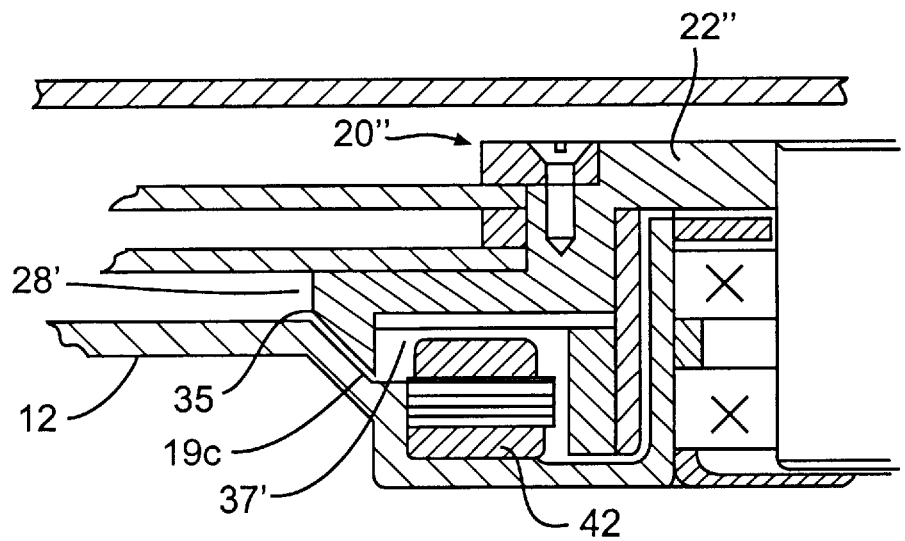

FIG. 3 shows a third embodiment of a disk storage device having a modified form of rotor assembly 20". The alumi-num hub 22" is fitted with a flat ferromagnetic shielding insert 37' spaced from the upper side of stator winding 42. Flange 28' of hub 22" is terminated in beveled surface 35 that forms a gap seal with a corresponding surface 19c of housing 12. Surface 19c replaces surfaces 19a and 19b of FIG. 2. Particularly for devices of reduced dimensions, the configuration of FIG. 3 simplifies manufacture and reduces cost.

Figure 4:
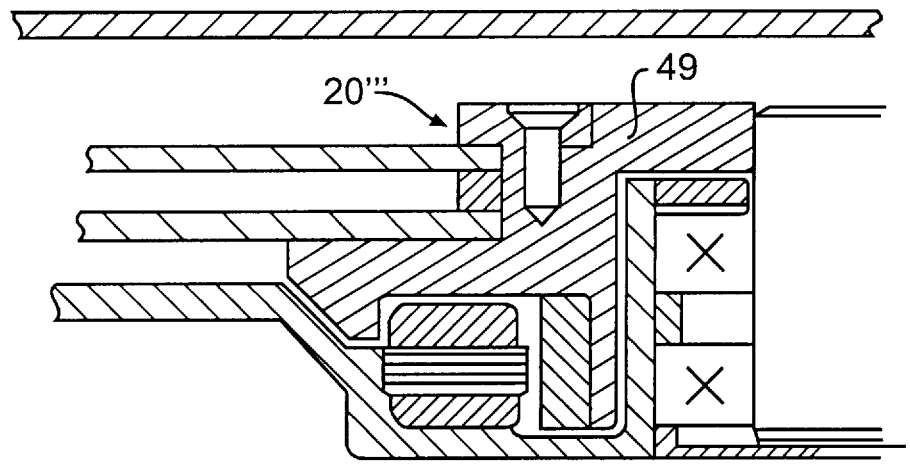

In the embodiment of FIG. 4, a steel hub 49 replaces the aluminum hub of previous embodiments and eliminates the need for separate magnetic yoke and magnetic shielding parts. This configuration enables further reduction of dimensions while also enabling reduced manufacturing cost.

Figure 5:
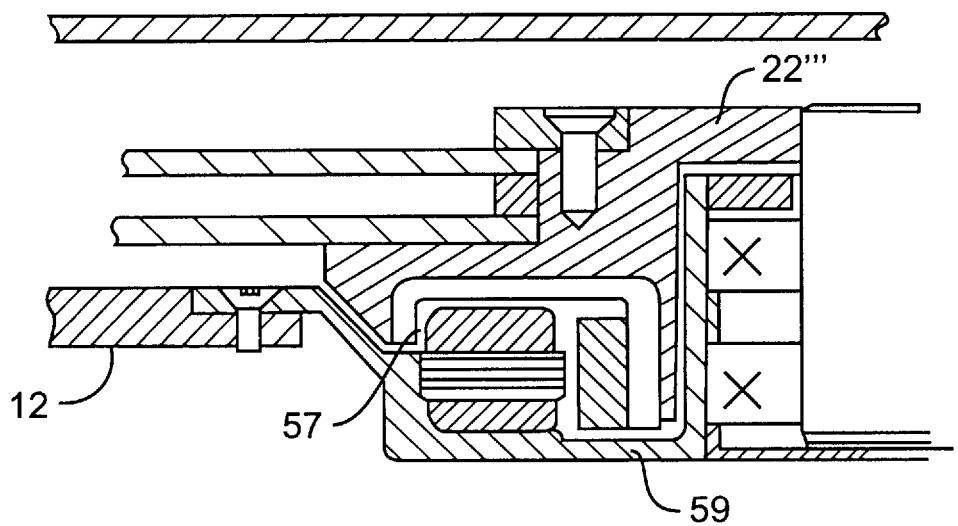

In the embodiment of FIG. 5, magnetic shielding yoke 57 replaces ferromagnetic insert 37 and ferromagnetic magnet support 26 of FIG. 2 and is fitted inside a further modified machined form of aluminum hub 22'". This embodiment also shows a separate assembly flange 59 supporting the spindle motor and mounted to lower wall 12 of the clean room housing.

Figure 6:
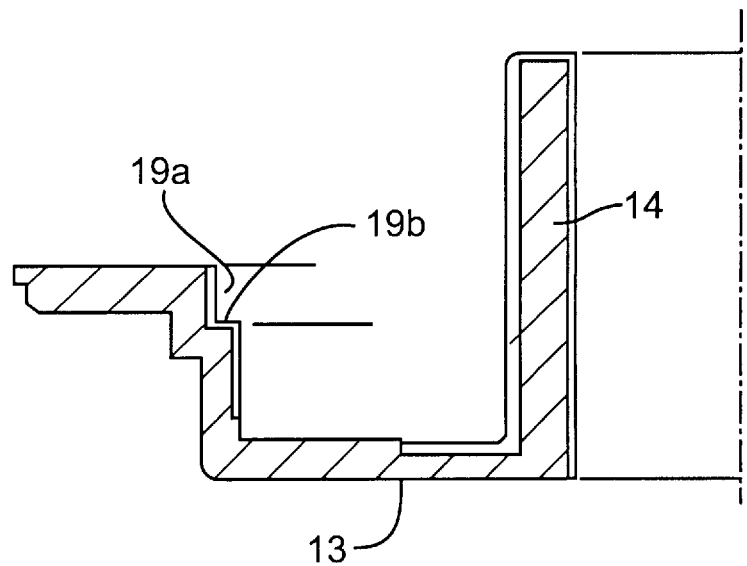
FIGS. 6 and 7 are partial cross-section of the preceding embodiments, showing machining details for relevant portions of the lower housing wall, hub, and bearing tube.
Figure 7:
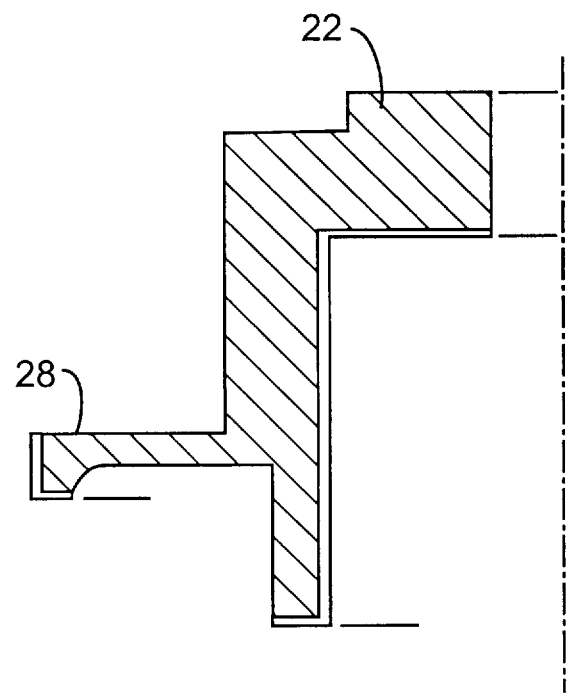

FIGS. 6 and 7 show the surfaces, with heavy lines, of the base plate 13 and hub 22 requiring machining for relatively close tolerances in the embodiment of FIG. 1. These surfaces include surfaces 19a and 19b, the vertical and top surfaces of bearing tube 14, and the surface of lower wall 12 where the lower edge of rotor 20 must pass over it. As shown in FIG. 7, the close tolerance surfaces of hub 22 are those at the periphery of flange 28 and inner cavity of hub 22. Preferably, these surfaces should be machined in a single chucking step to assure a close fit.

Figure 8:
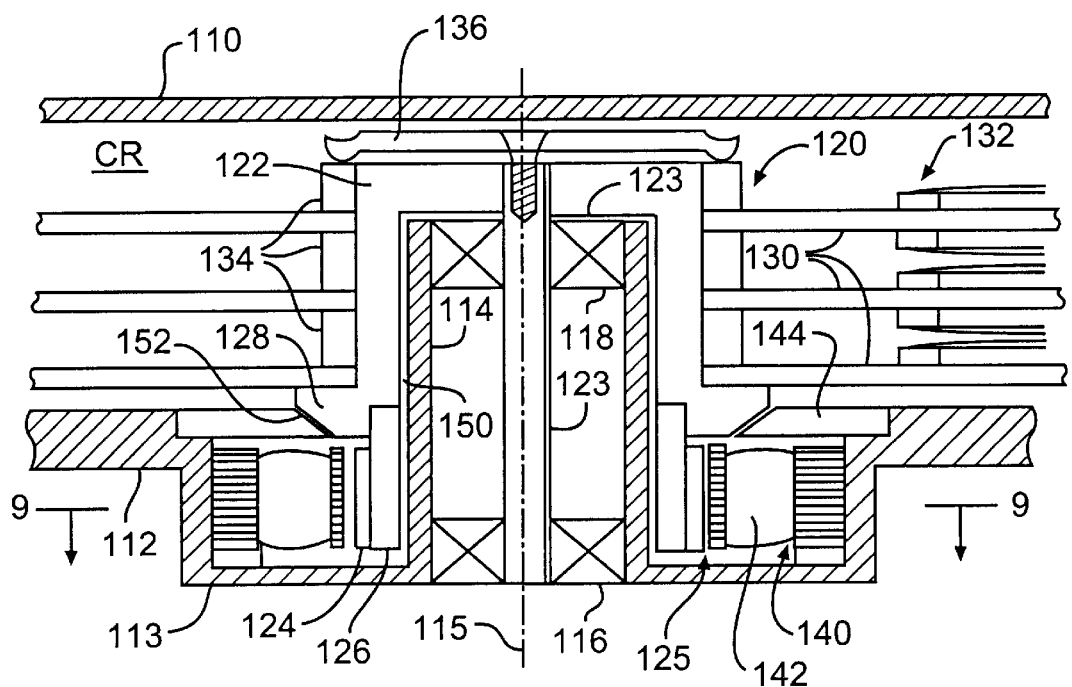
FIG. 8 is a cross-section taken along the spindle axis of a disk storage device employing a still further embodiment of the invention.
Figure 9:
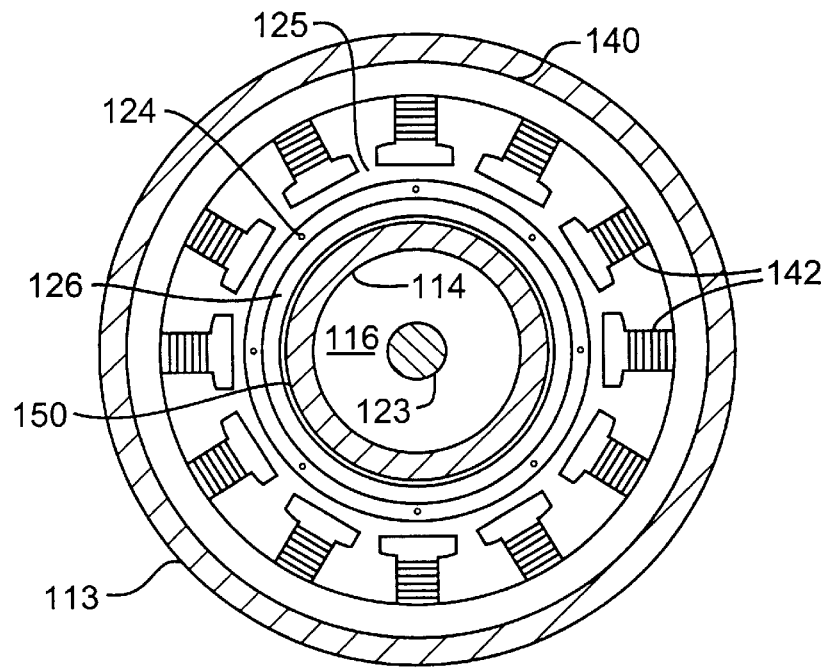
FIG. 9 is a cross-section taken along line 9—9 of FIG. 8 perpendicular to the spindle axis, showing how the stator lamination and windings interact with the magnet ring of the rotor.

In the embodiment of FIG. 8, the illustrated disk storage device is similar in most respect to that of FIG. 1. It includes a housing having an upper partition or wall 110 and a lower partition or wall 112 which adjoin side walls (not shown) to enclose a substantially sealed "clean room chamber" CR similar to that of FIG. 1. Data storage disks 130 are mounted on a hub 122 that is part of a rotor assembly 120 of a brushless DC spindle motor. The drive elements of the spindle motor are supported inside the clean room chamber within a recessed portion 113 of the lower wall 112 of the HDD housing. Hub 122 is cylindrically shaped and dimensioned to fit through the center opening of the disks. The hub has a radially extending shoulder 128 for supporting the lower disk 130 that may be part of a disk stack. The hub 122 may be made of an aluminum alloy, which is a material that is suitable for use after machining in a clean room environment. One or more spacer rings 134 separate the disks and a clamping spring 136 is fastened to the closed end of the rotor 120 and presses against the upper spacer ring 134 to couple the disks to the hub 122.

The rotor assembly 120 rotates on a shaft 123 that is press-fit into or otherwise attached to the closed end of the rotor. Shaft 123 is supported to rotate about the spindle axis 115 by a pair of axially spaced bearings 116 and 118. Bearings 116 and 118 are mounted within a bearing tube 114 or other form of cylindrical support member that is an integral part of, or is attached to, the recessed wall portion 113. The recessed wall portion 113 may be an integral part of the HDD housing wall 112, or it may be in the form of a detachable assembly flange. If the latter, the spindle motor can be manufactured as a separate unit that is installed into an opening in the HDD housing at the time of final HDD assembly.

The spindle motor further includes a permanent magnet 124 that is in the form of an annular ring affixed to a cylindrical ferromagnetic support member 126. The latter is attached to the lower end of the rotor hub portion 122. Hub 122 has a cylindrically-shaped central cavity 129 that fits over the upper end of bearing tube 114. The magnet support member 126 encircles the bearing tube 114. A narrow gap 150 is formed between the outer surface of the bearing tube and the inner surface of the rotor 120 and forms a "gap seal" to reduce the transfer of particles and other contaminants emanating from the bearings 116 and 118 into the clean room chamber. A ring 144 is set into the housing wall 112 and surrounds the disk mounting flange 128 of the hub 122. A narrow gap 152 is formed between the outer periphery of the flange 128 and the inner periphery of the ring 144 and functions as a further gap seal to retard the transfer of contaminants into the clean room chamber.

A stator assembly 140 is supported within the recessed wall portion 113 and encircles the rotor magnet 124. The stator 140 has windings 142 wound on the stator laminations and a plurality of poles separated from the magnet 124 by a cylindrically-shaped air gap 125. As shown in FIG. 9, the stator 140 may, for example, include twelve equally spaced poles and associated windings, that cooperate with, for example, eight rotor poles (shown schematically by dots on magnet 124). A motor driving circuit (not shown) switches timed current pulses into the stator windings to generate flux that interacts with the flux produced by magnet 124 to generate torque on the rotor 120. This rotates the rotor and enables data transfer to occur between the read/write heads 132 and the recording surfaces of disks 130.

Figure 10:
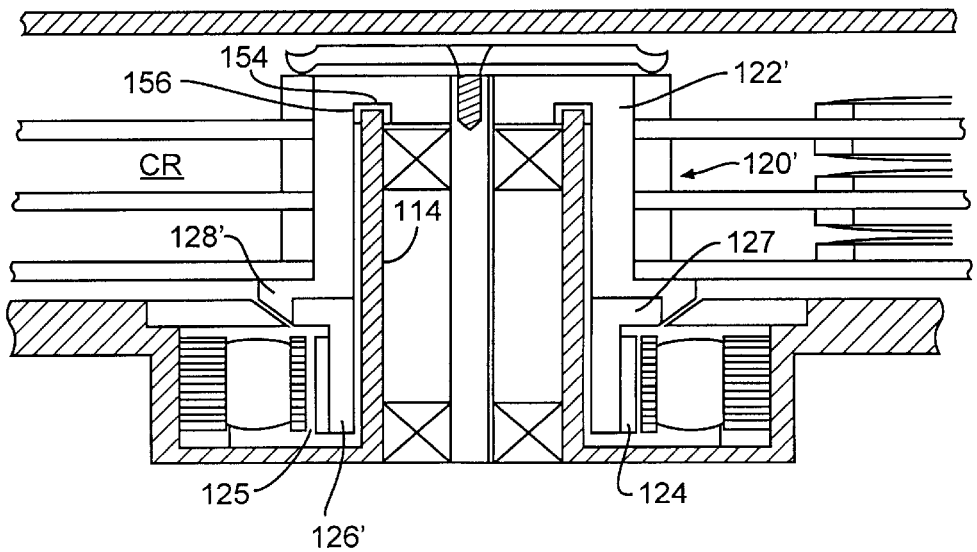
FIG. 10 is a cross-section taken along the spindle axis showing another modified form of the spindle motor.

FIG. 10 shows another embodiment of a disk storage device having a modified form of rotor assembly 120'. The underside of the closed end of the hub 122' is provided with an annular groove 154 that mates with the extended upper end of the bearing tube 114 to form a labyrinth seal 156 that further enhances retardation of contaminant particle movement toward the clean room chamber. FIG. 10 also shows that modified rotor assembly 122' employs a ferromagnetic magnet support member 126' that has a radially-extending lip 127 projecting into the disk support flange 128'. The lip 127 extends across the end of the magnet 124, the air gap 125 and partially encloses the pole faces of the stator lamination. Any stray flux that may emanate from the area of the motor air gap will be contained by the lip 127 and prevented from impinging on the data storage disks 130.

Figure 11:
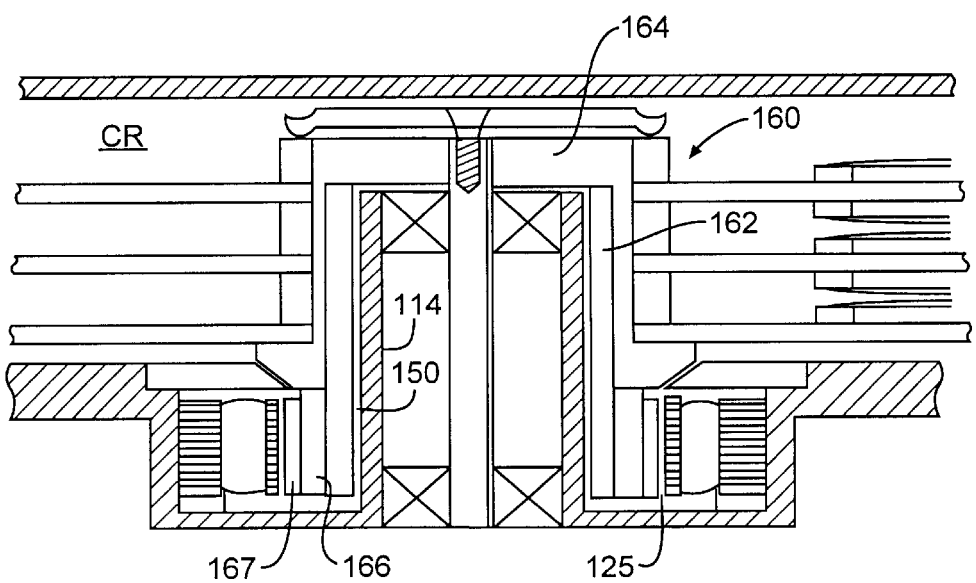
FIG. 11 is a similar view illustrating yet another embodiment of the spindle motor.

FIG. 11 illustrates a still further embodiment of data storage device having a further modified spindle motor. The rotor assembly 160 is provided with an internal sleeve 162 that is press fit or glued inside the hub portion 164. The permanent magnet ring 167 and ferromagnetic support member 166 are affixed about an end of the sleeve 162. Sleeve 162 can be formed of an aluminum alloy and has a precisely machined inner diameter. The outer diameter of the bearing tube 114 may also be precisely machined to permit close spacing with respect to the sleeve 162 so that gap seal 150 is made very narrow and hence more effective in retarding transfer of contaminant particles toward the clean room CR.

Sleeve 162 also positions the magnet ring 167 and air gap further away from the axis of rotation. This increases the radius of the magnet 167 and the air gap 125 so that the magnet and air gap both have diameters substantially exceeding the diameter of the disk mounting hub 164. In this regard, the embodiment of FIG. 11 is similar to that of FIG. 1. This permits generation of a higher motor torque without increasing the height of the spindle or the diameter of the hub. In fact, the motor arrangement of the invention allows the torque produced by the motor to be essentially independent of both the spindle height and hub diameter.

As illustrated in the above, the inner rotor-rotating shaft design of the disk storage device of the present invention provides several advantages. Among these are the following.

The rotor assembly has reduced mass because the hub portion is essentially hollow and the magnetic ring and ferromagnetic support member are not affixed to a radially-extending support structure, as is required in an outer rotor design, allowing the rotor mass to be reduced and located closer to the axis of rotation. These features allow the same drive torque to accelerate the spindle assembly to the required operating speed in a shorter time and reduce vibrations at higher operating speeds. Further, the motor diameter can be increased without incurring a proportionate increase in rotor mass.

Still further, the spindle axis is fixed by a relatively large diameter bearing tube or cylindrical structure, which is more rigid than the stationary shaft or post usually used to support the spindle.

In addition, because the stator components are located away from the spindle axis, there is more room in the center of the assembly for the bearings and they can be spaced further apart to reduce spindle run out due to play in the bearings.

Still further, the rotor configuration allows for an extended-length cylindrical gap seal for providing enhanced isolation of the bearings from the clean room. The gap seal may be used along with one or more labyrinth seals (such as formed by the gap 156 shown in FIG. 10) to further retard the migration of contaminants into the clean room chamber.

Although we have shown and described this invention in connection with certain embodiments, additional alternatives, modifications, and variations may be apparent to those skilled in the art in view of the foregoing description. Accordingly, this invention is intended to embrace all such alternatives, modifications, and variations as fall within the spirit and scope of the appended claims.

What is claimed is:

1. In a disk storage device, the combination comprising:
    a housing enclosing a clean chamber;
    at least one data storage disk located within said clean chamber;
    transducer means for reading data recorded on said disk; and
    a motor for rotating said data storage disk past said transducer means, said motor including a rotor having a disk mounting portion positioned within said clean chamber; means for coupling said data storage disk to said disk mounting portion; a shaft located along an axis of rotation and affixed to said rotor for rotation therewith; a support member contiguous with said housing including a bearing support; first and second axially spaced bearings rotatably supporting said shaft and mounted within said bearing support; a stator having one or more windings surrounding said bearing support and positioned on (the same side) of said support member as said clean chamber; and an annular permanent magnet surrounded by said stator and spaced therefrom to form a substantially cylindrical air gap therewith, said permanent magnet being affixed to said rotor and arranged to interact with magnetic flux produced by said stator to drive said rotor and rotate said data storage disk about said axis of rotation.

2. In a disk storage device, the combination according to claim 1, wherein said disk mounting portion of said rotor has a cylindrical cavity and a closed end at which said shaft is affixed to said rotor, said cylindrical cavity closely surrounding said bearing support and forming a cylindrical gap seal extending to said housing.

3. In a disk storage device, the combination according to claim 2, wherein the cylindrical cavity of said disk mounting portion includes an inner surface providing a uniform gap seal with respect to said bearing support.

4. In a disk storage device, the combination according to claim 2, wherein a portion of the means for coupling said data storage disk to said disk mounting portion of said rotor forms an additional gap seal with respect to said housing.

5. In a disk storage device, the combination according to claim 2, further comprising a ring element affixed to said housing and surrounding the disk mounting portion of said rotor to form an additional gap seal located in a particle movement path between said motor and said clean chamber.

6. In a disk storage device, the combination according to claim 2, wherein said bearing support comprises a hollow cylinder supporting said first and second bearings on an inner surface thereof, said storage device further comprising a washer located near an end of said bearing support between said bearings and said disk mounting portion of said rotor, said washer acting to retard the transfer of particles from said bearings into said clean chamber.

7. In a disk storage device, the combination according to claim 1, wherein said bearing support encloses a central space extending between said first and second axially spaced bearings.

8. In a disk storage device, the combination according to claim 7, wherein said shaft is press-fit into an opening of a closed end of the disk support portion of the rotor and said first bearing is immediately adjacent said closed end.

9. In a disk storage device, the combination according to claim 8 wherein said second bearing is in a plane coincident with a recessed wall portion of said housing.

10. In a disk storage device, the combination according to claim 1, wherein said disk support portion of said rotor is comprised of a nonferromagnetic material that is suitable for use after machining, in a clean room environment, and further including a cylindrical ferromagnetic support member of said rotor supporting said annular permanent magnet.

11. In a disk storage device, the combination according to claim 10, wherein the cylindrical magnetic support member includes a shielding element radially extending toward and overlapping a portion of said stator.

12. In a disk storage device, the combination according to claim 1, wherein the cylindrical air gap has a larger diameter than the diameter of said disk mounting portion of said rotor.

13. In a disk storage device, the combination according to claim 1, wherein the permanent magnet has a larger diameter than the diameter of said disk mounting portion of said rotor.

14. In a disk storage device, the combination according to claim 1, wherein the outer diameter of said stator is greater than the diameter of said disk mounting portion of said rotor.

15. In a disk storage device, the combination according to claim 1, wherein said disk mounting portion of said rotor is made of a ferromagnetic material.

16. In a disk storage device, the combination according to claim 15, wherein said ferromagnetic material is steel.

17. In a disk storage device, the combination comprising:
a housing enclosing a clean chamber;
at least one data storage disk located within said clean chamber;
transducer means for reading data recorded on said disk; and
a motor for rotating said data storage disk past said transducer means, said motor including a rotor having a disk mounting portion positioned within said clean chamber; said disk mounting portion including a radially extending shoulder supporting said data storage disk; a stator having one or more windings supported on a member contiguous with said housing, said stator being located on the same side of said housing as said clean chamber; a shaft aligned along an axis of rotation and affixed to said rotor for rotation therewith; a bearing support member having bearings rotatably supporting said shaft; and an annular permanent magnet affixed to said rotor and positioned within said stator so as to form an air gap therewith, said stator and permanent magnet being located immediately adjacent the radially extending shoulder of said disk mounting portion of said rotor and positioned on the side thereof opposite to said data storage disk, whereby flux produced by said stator interacts with said permanent magnet to rotate said rotor and data storage disk about said axis of rotation.

18. In a disk storage device, the combination according to claim 17, wherein said disk mounting portion of said rotor has a cylindrical cavity and a closed end at which said shaft is affixed to said rotor, said cylindrical cavity closely surrounding said bearing support and forming a cylindrical gap seal extending to said housing.

19. In a disk storage device, the combination according to claim 18, wherein the cylindrical cavity of said disk mounting portion includes an inner sleeve machined to provide a close tolerance gap with respect to said bearing support.

20. In a disk storage device, the combination according to claim 18, wherein said radially extending shoulder supporting said data storage disk forms an additional gap seal with respect to said housing.

21. In a disk storage device, the combination according to claim 17, wherein said bearing support encloses a central space extending between said first and second axially spaced bearings.

22. In a disk storage device, the combination according to claim 21, wherein said shaft is press-fit into an opening of a closed end of the disk support portion of the rotor and said first bearing is immediately adjacent said closed end.

23. In a disk storage device, the combination according to claim 22, wherein said second bearing is in a plane coincident with a recessed wall portion of said housing.

24. In a disk storage device, the combination according to claim 17, wherein said disk support portion of said rotor is comprised of a nonferromagnetic material that is suitable for use, after machining, in a clean room environment, and further including a cylindrical ferromagnetic support member of said rotor supporting said annular permanent magnet.

25. In a disk storage device, the combination according to claim 24, wherein the cylindrical ferromagnetic support member includes a shielding element radially extending toward and overlapping a portion of said stator.

26. In a disk storage device, the combination according to claim 17, wherein the cylindrical air gap has a larger diameter than the diameter of said disk mounting portion of said rotor.

27. In a disk storage device, the combination according to claim 17, wherein the permanent magnet has a larger diameter than the diameter of said disk mounting portion of said rotor.

28. In a disk storage device, the combination according to claim 17, wherein the outer diameter of said stator is greater than the diameter of said disk mounting portion of said rotor.

29. In a disk storage device, the combination according to claim 17, further comprising a ring element affixed to said housing and surrounding said radially extending shoulder of said disk mounting portion of said rotor to form an additional gap seal located in a particle movement path between said motor and said clean chamber.

30. In a data storage device, the combination comprising:

a housing enclosing a clean chamber;

at least one data storage disk located within said clean chamber;

transducer means for reading data recorded on said disk; and a motor for rotating said data storage disk past said transducer means, said motor including a rotor having an annular flux producing and conducting member and a hub portion, said hub portion extending through a central opening in said disk and having a central cavity opening toward one end of said hub portion, said flux producing and conducting member being affixed to an end of said hub portion in concentric alignment with said central cavity; a stator having at least one winding, said stator positioned to surround said flux producing and conducting member and spaced therefrom by an air gap; a shaft affixed to said rotor and aligned with an axis of rotation that extends through the central cavity of said hub portion; and a bearing support having bearings rotatably supporting said shaft, said bearing support having a cylindrical outer surface that is spaced from the inner wall of said central cavity of said hub portion and from said annular flux producing and conducting member by a narrow gap that retards the escape of particles from said bearings into said clean chamber.

31. In a disk storage device, the combination according to claim 30, wherein said central cavity of said hub includes an inner sleeve machined to provide a close tolerance gap with respect to said outer surface of said bearing support.

32. In a disk storage device, the combination according to claim 31, wherein an outer peripheral surface of said hub forms an additional narrow gap with respect to said housing for further retarding the escape of particles from said motor into said clean chamber.

33. In a disk storage device, the combination according to claim 30, wherein said bearing support encloses a central space extending between first and second axially spaced bearings.

34. In a disk storage device, the combination according to claim 33, wherein said shaft is press-fit into an opening in a closed end of said hub portion, and said first bearing is immediately adjacent said closed end.

35. In a disk storage device, the combination according to claim 34, wherein said second bearing is in a plane coincident with a recessed wall portion of said housing.

36. In a disk storage device, the combination according to claim 30, wherein said hub portion of said rotor is comprised of a nonferromagnetic material that is suitable for use, after machining, in a clean room environment, and wherein said annular flux producing and conducting member includes an annular permanent magnet affixed to a ferromagnetic support member.

37. In a disk storage device, the combination according to claim 36, wherein the ferromagnetic support member includes a shielding element radially extending toward and overlapping a portion of said stator.

38. In a disk storage device, the combination according to claim 30, wherein said air gap has larger diameter than the diameter of said central opening of said disk.

39. In a disk storage device, the combination according to claim 30, wherein said flux producing and conducting member has a larger diameter than the diameter of said central opening of said disk.

40. In a disk storage device, the combination according to claim 30, wherein the outer diameter of said stator is greater than the diameter of said central opening of said disk.

41. In a disk storage device, the combination according to claim 30, further comprising a radially-extending disk support flange on said hub portion of said rotor, and a ring element adjacent the periphery of said flange and spaced therefrom to form a further narrow gap for retarding the escape of particles from said motor into said clean chamber.

* * * * *

UNITED STATES PATENT AND TRADEMARK OFFICE
CERTIFICATE OF CORRECTION

PATENT NO. : 5,877,916
DATED : March 2, 1999
INVENTOR(S) : Georg F. Papst

It is certified that error appears in the above-indentified patent and that said Letters Patent is hereby corrected as shown below:

Claim 1, column 6, line 56, delete "(" and ")".

Signed and Sealed this

Twenty-second Day of May, 2001

Attest:

NICHOLAS P. GODICI

Attesting Officer      Acting Director of the United States Patent and Trademark Office